(12) United States Patent
Bryant

(10) Patent No.: US 6,286,046 B1
(45) Date of Patent: *Sep. 4, 2001

(54) METHOD OF RECORDING AND MEASURING E-BUSINESS SESSIONS ON THE WORLD WIDE WEB

(75) Inventor: Raymond Morris Bryant, Austin, TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,225

(22) Filed: Dec. 22, 1997

(51) Int. Cl.[7] .............................. G06F 13/14; G06F 11/30; G06F 15/173
(52) U.S. Cl. ........................ 709/224; 709/204; 709/227
(58) Field of Search ...................... 709/204, 224, 709/227, 228, 223, 245, 246; 714/39, 45, 46; 370/252

(56) References Cited

U.S. PATENT DOCUMENTS

| | | | |
|---|---|---|---|
| 4,462,077 | * | 7/1984 | York ......................................... 714/45 |
| 5,347,649 | * | 9/1994 | Alderson ................................. 714/45 |
| 5,678,002 | * | 10/1997 | Fawcett et al. ....................... 709/224 |
| 5,742,762 | * | 4/1998 | Scholl et al. .......................... 709/224 |
| 5,931,904 | * | 8/1999 | Banga et al. .......................... 709/217 |
| 5,933,827 | * | 8/1999 | Cole et al. .............................. 707/10 |
| 5,948,066 | * | 9/1999 | Whalen et al. ........................ 709/229 |
| 6,070,184 | * | 5/2000 | Blount et al. .......................... 709/200 |

OTHER PUBLICATIONS

Ross, K.W., "Hash routing for collections of shared Web caches", IEEE Network, vol. 11, Issue 6, pp. 37–44, Nov. 1997.*

Tattam, Peter R., "Trumpet Winsock, Version 2.0", Trumpet Software International Pty Ltd., p. 34, 1993.*

\* cited by examiner

Primary Examiner—Mark H. Rinehart
Assistant Examiner—Almari Romero
(74) Attorney, Agent, or Firm—Jeffrey S. Labace; Joseph R. Burwell; David H. Judson

(57) ABSTRACT

A monitor located between a Web browser and a server upon which a server application is running. The monitor is useful for recording a set of URLs (sometimes referred to as a "request list") that issue from the Web browser during a sample interactive session between the user of the client machine and the server application. The URL request list trace or session "workload" may then be used to benchmark the server application by supplying the information as an input to a set of HTTP submitter routines. Each HTTP submitter routine simulates a particular user of a client machine connected to the server application. Each routine then "replays" the interactive session recorded by the monitor so that the overall performance of the server application against "multiple" simulated users may be evaluated.

29 Claims, 3 Drawing Sheets

METHOD OF RECORDING AND MEASURING E-BUSINESS SESSIONS ON THE WORLD WIDE WEB

BACKGROUND OF THE INVENTION

1. Technical Field

The present invention relates generally to communications within a client-server computer network and, in particular, to a method of recording and measuring information about a particular communication session between a client application and a server application.

2. Description of the Related Art

Doing business in an electronic manner is highly advantageous. An electronic business or so-called "e-business" is one that uses certain tools to connect its critical business systems directly to employees, customers, vendors and other important constituencies. An "intranet" is an e-business application deployed within a business. An "extranet" is an e-business application deployed within the larger community of a business, including its suppliers, vendors and contractors. Connecting either one to the Internet's World Wide Web makes the information it contains accessible from anywhere using conventional browser software.

A goal of e-business is to move online all processes that require a dynamic and interactive flow of information. These include, without limitation, service and support, managing supply chains, buying and selling, and the like. Examples of an e-business application include Internet banking or Internet retail sales.

Because an e-business application running on a Web server may have to support a large number of interactions in a given time period, measuring and tuning the performance of the application is an important goal. Similarly, because reliability and functional correctness of the e-business application are paramount, functional and system testing of the application are also important elements of the development process. Also, if an individual user of the e-business application encounters poor response time, it may be important from a customer service viewpoint to be able to quantify and measure the exact nature of the user's performance difficulty in order to resolve the problem. Such measurements should concentrate on the delay of the server as it interacts with the user as opposed to measuring performance characteristics of the client machine (e.g., how long it takes the browser to render the servers response on the client machine).

An important part of performance measurement and system testing of an e-business application is the problem of capturing a test workload. A test workload is a set of URL requests that take place between a client application and a e-business application during a simulated or "sample" interactive session involving the application. A test workload, theoretically, could be replayed to the server for performance measurement or functional testing purposes. The prior art, however, does not provide any adequate means or method of compiling such workload information. A possible solution is a manual "monitoring" technique, wherein one could just watch the URLs that the browser submits and copy these URLs down by hand in order to create a list of requests to the application (i.e. a "request list"). For most e-business applications, however, the URLs are complex and hard to read due to "URL encoding". Copying the requests down by hand is thus extremely error prone for all but the simplest of e-business applications.

Thus, there remains a need to provide a technique to monitor and record information about specific requests to a server application, such as an e-business application, to thereby generate "workload" information that may then be used for later playback to benchmark the server application.

BRIEF SUMMARY OF THE INVENTION

The present invention provides a monitor tool that preferably sits between a Web browser and a server upon which a server application is running. The monitor tool is useful for recording a set of URLs (sometimes referred to as a "request list") that issue from the Web browser during a sample interactive session between the user of the client machine and the server application. The URL request list trace or session "workload" may then be used to benchmark the server application by supplying the information as an input to a set of HTTP submitter routines. Each HTTP submitter routine simulates a particular user of a client machine connected to the server application. Each routine then "replays" the interactive session recorded by the monitor so that the overall performance of the server application against "multiple" simulated users may be evaluated.

The monitor tool is provisioned such that, from the browser's perspective, the tool appears to be the server itself; likewise, from the server's perspective, the tool appears to be the browser. Moreover, communications between the browser and the monitor are carried out in an unencrypted manner, although the monitor provides whatever secure connection (e.g., a secure sockets layer ("SSL") connection) that is expected or may be required with respect to the communications to and from the server. The monitor further includes a link substitution algorithm that prevents the browser from escaping from the connection to the monitor. In addition, the monitor tool may also be used to measure response times associated with the interactive session.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
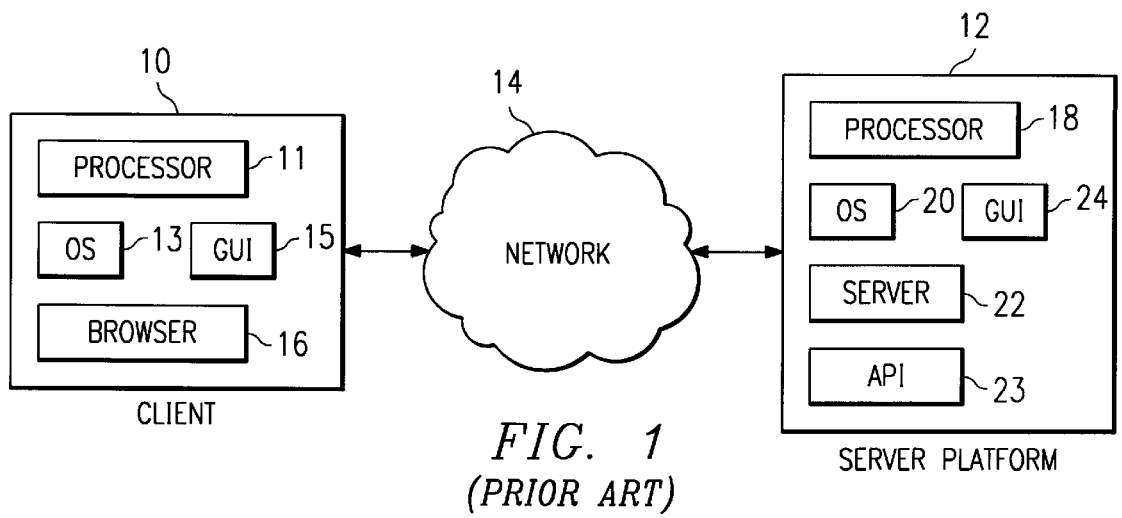
FIG. 1 is a representative client-server computer system of the Prior Art.

A representative client-server network system known in the Prior Art is illustrated in FIG. 1. A client machine 10 is connected to a Web server platform 12 via network 14. For illustrative purposes, network 14 is the Internet, an Intranet or other known network connection. Web server platform 12 is one of a plurality of servers which are accessible by clients, one of which is illustrated by machine 10. A representative client machine includes a processor 11, operating system 13, graphical user interface 15, and a Web browser 16. A Web browser is a known software tool used to access the servers of the network. The Web server platform supports files (collectively referred to as a "Web" site) in the form of hypertext documents and objects. In the Internet paradigm, a network path to a server is identified by a so-called Uniform Resource Locator (URL).

A representative Web Server platform 12 comprises an IBM RISC System/6000 computer 18 (a reduced instruction set of so-called RISC-based workstation) running the AIX® (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The Web server 18 also includes an Application Programming Interface (API) 23 that provides extensions to enable application developers to extend and/or customize the core functionality thereof through software programs commonly referred to as "plug-ins."

A representative Web client is a personal computer that is x86-, PowerPC®- or RISC-based, that includes an operating system such as IBM® OS/2® or Microsoft Windows 95, and that includes a browser, such as Netscape Navigator 3.0 (or higher), having a Java Virtual Machine (JVM) and support for application plug-ins and helper applications.

As is well-known, the Web server accepts a client request and returns a response. The communication between the browser and the server is conducted using the HTTP protocol. According to the present invention, it is assumed that the Web server supports an e-business application under development, testing or (perhaps) in use. The present invention provides a mechanism to capture and replay a session between a Web browser and a Web server supporting a given server application. For purposes of discussion, this session is associated with a given e-business application provided from a set of one or more servers in the computer network. One of ordinary skill, however, will recognize that the principles of the invention are not limited to just monitoring session information during an e-business transaction.

Figure 2:
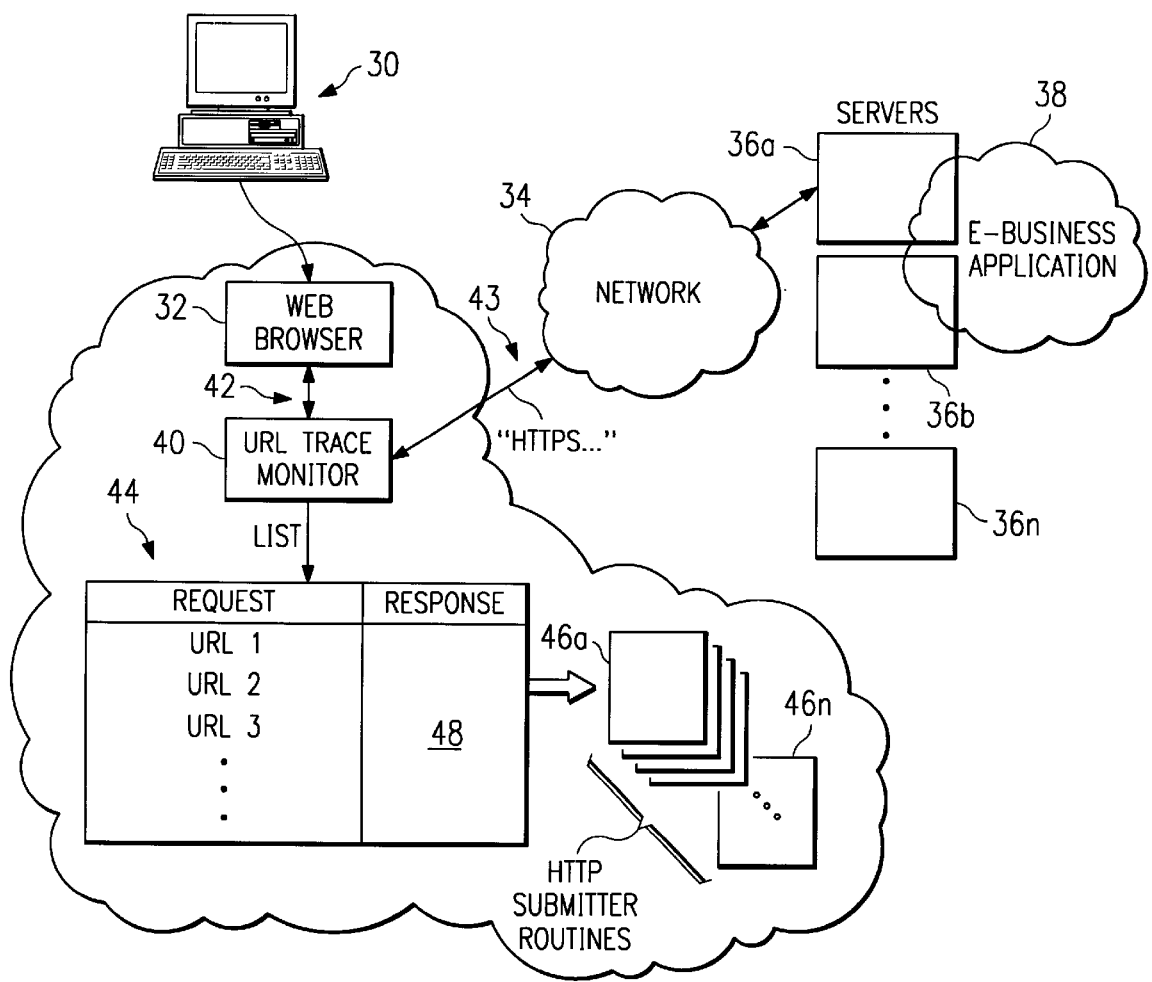
FIG. 2 is an illustrative network environment in which the present invention is implemented.

FIG. 2 illustrates a system in which the present invention is implemented. It includes a client machine 30 having a Web browser 32, which is connectable via network 34 to a set of one or more servers 36a–36n at least one of which supports a given e-business application 38. Network 34 may be an intranet, an extranet, the Internet, or any known or later-developed computer network. The objects of the present invention are provided by a monitor 40, which is preferably supported and run on the client machine as illustrated. The monitor 40 may be supported and run on another machine, of course, including a machine connected to the client. Regardless of where it is supported, the monitor is designed to sit between the browser and the server that implements the e-business application.

The primary function of the monitor 40 is to record a set of URLs (sometimes referred to as a "request list") that issue from the Web browser during an interactive sample session between the user of the client machine and the server application. In a typical interactive session, there may be 15–20 URLs (although this number is merely representative) generated from the client machine and passed to the e-business application or to other applications associated therewith. Thus, for example, consider a typical Internet banking transaction. In a given session, a user may logon, ask for an account balance, write an electronic check, deposit funds, and then logoff. One or more of these tasks may require a connection from the client to the e-business server application (or to some third party application associated therewith). Moreover, a particular URL may be quite complex given that the user may be required (in connection with the request) to enter various fields of information (typically through a CGI scripting process or the like).

According to the invention, the URL request list trace or session "workload" for the particular interactive session is recorded in a file 44. The information in the file 44 may then be used to benchmark the e-business server application by supplying the information as an input to a set of HTTP submitter routines 46a–n. Each HTTP submitter routine 46 simulates a particular user of a client machine connected to the server application. In a separate process, each of the set of HTTP submitter routines then "replays" the interactive session recorded by the monitor so that the overall performance of the server application against multiple users may be evaluated.

Because the conduct of the e-business application may require the exchange of private information (e.g., credit card numbers or other personal data), the connection between the browser and the server may be conducted using the "https" (or secure socket layer) protocol. As is known, the Secure Socket Layer (SSL) protocol Version 3 is defined by a draft Internet standard that is available from Netscape Communications Corporation. That standard is incorporated herein by reference. A characteristic of SSL is that the connection between the browser and the server is encrypted and third parties are theoretically unable to decipher the content of the exchange between the browser and server.

The requests issued by the browser 32 to the monitor 40 are unencrypted over connector 42 (which may be an interprocess communication path (IPC). Nevertheless, the connection 43 between the browser and the Web server may still be an https (secure socket or other such secure) connection because the monitor 40 establishes the secure socket connection to the server 36 (while the connection between the browser and the server is an unencrypted (e.g., http) connection). When the monitor receives the request from the browser, it preferably uses the SSL (https) protocol to forward the request to the server if that is the protocol the server uses. Thus, strictly speaking, the monitor does not bypass SSL; it merely adds SSL to the connection.

As illustrated in FIG. 2, according to the invention, when the monitor is in use, all requests that would normally be sent to the server 36 are sent to the monitor 40 instead. The monitor 40 then forwards the requests to the actual server and receives the responses from the server 36. Responses from the server are then returned from the monitor 40 to the browser 32. In effect, the monitor 40 acts as an HTTP request/response forwarder that masquerades as the actual server (as far as the browser is concerned) and the actual browser (as far as the server is concerned). To achieve the masquerade, the monitor 40 translates the HTTP requests received from the browser 32 before sending these requests to the server, and it translates the HTTP responses and HTML received from the server before these responses are delivered to the browser. These translation functions are described below.

As browser requests are received by the monitor 40, the monitor performs the monitoring function or some other function as selected by options specified when the monitor is started. As has been described, the monitor function writes the set of URLs (i.e. the URL trace) to the file 44. In addition to the Web requests, the monitor may also record information 48 (in the request file 44 or in some other file) characterizing the response received from the server. This characterization can be as simple as a checksum of the page returned from the server, or a more elaborate characterization. Such characterization can then be later used to verify that the response received from the server is a correct response. Thus, for example, a verification might involve matching a checksum to fully parsing and analyzing the HTML response. Any particular verification technique may be used.

As discussed above, each HTTP submitter routine 46 takes a list of URLs and associated data, connects to a Web server, submits the URLs, and fetches the responses. This operation thus simulates the interactive session without having to run the server application against an actual client machine. Such "submitter" routines are well known and within the state-of-the-art. They are available in the literature or via download on the Internet. In the present invention, any suitable HTTP submitter routine 46 may be used to perform the replay function provided the program can read the particular request file format created by the monitor 40.

Another function that may be provided by the monitor is to time the response time of the server and record this timing information for later analysis. Because measurements are completed by the monitor before the HTML response data is returned to the browser for rendering, response time data measured by the monitor is characteristic of the responses returned to the user by the server (as opposed to being characteristic of the speed with which the browser executes on the client machine). In addition, the monitor may identify the component of time spent on the client machine performing the SSL protocol and it is thus able to remove that component of time from the perceived response time at the SSL interface. Thus, the resulting response time statistics are (as much as possible) a true measure of the e-business response time as opposed to a measure of e-business response time commingled with data relating to performance of the client machine.

Any particular response time routines may be implemented at the monitor. Exemplary response time monitoring techniques are illustrated in U.S. Ser. Nos. 08/924,986 and 08/924,987, filed Sep. 8, 1997, and Sep. 8, 1997, respectively, titled "World Wide Web End User Response Time Monitor" and "World Wide Web Internet Delay Monitor". Each such application is assigned to the assignee of this application and is incorporated herein by reference.

Figure 3:
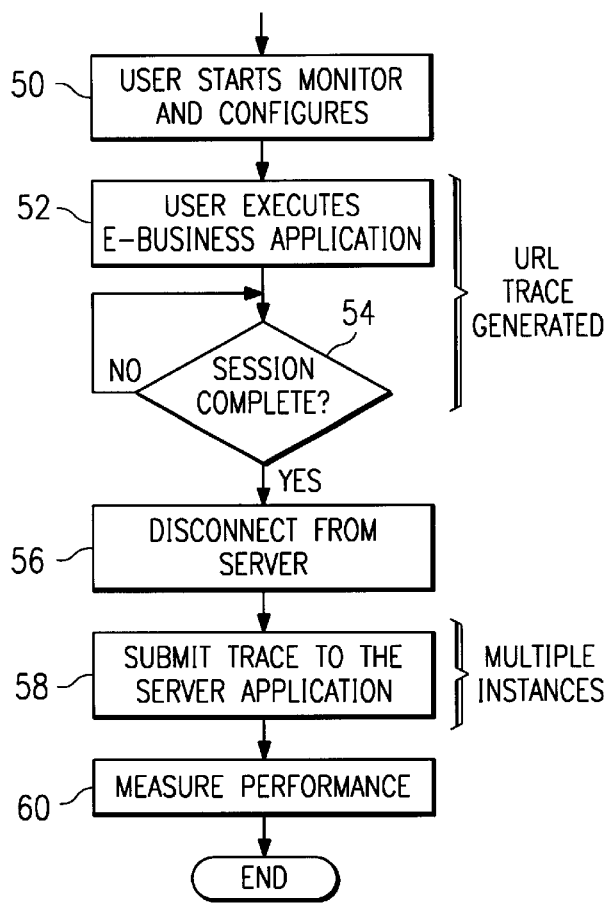
FIG. 3 is a flowchart illustrating a preferred method of using the inventive monitor in a performance or functional testing environment.

FIG. 3 is a flowchart illustrating a typical scenario for use of the monitor 40 in a performance or functional testing environment. This scenario is merely representative. The routine begins at step 50 with the user (in this case, probably a performance analyst or system test developer) starting the monitor and configuring it to sit between the user's browser and the associated e-business server under test. At step 52, the user executes an e-business transaction against the server. At step 54, a test is done to determine if the session is complete. If not, the routine cycles and continues executing the e-business transaction. If, however, the outcome of the test at step 54 indicates that the session is complete, the routine continues at step 56 and disconnects from the server. During the session, the monitor generates the URL request file as previously described. At step 58, the user takes the URL request file written by the monitor and, using the HTTP submitter routine(s), submits multiple instances of the session to the e-business Web server. At step 60, the response time of the server and/or correctness of the responses generated (using a response characterization written to the request file by the monitor) is then calculated or otherwise determined. The response time may be determined by the monitor (by setting a "record timing data" option) directly or through other routines.

In one embodiment, it may be desirable that multiple such recording runs are done, with the results that a synthetic "workload" would then be manufactured out of the various request files so collected prior to supplying the data to the HTTP submitter programs.

Figure 4:
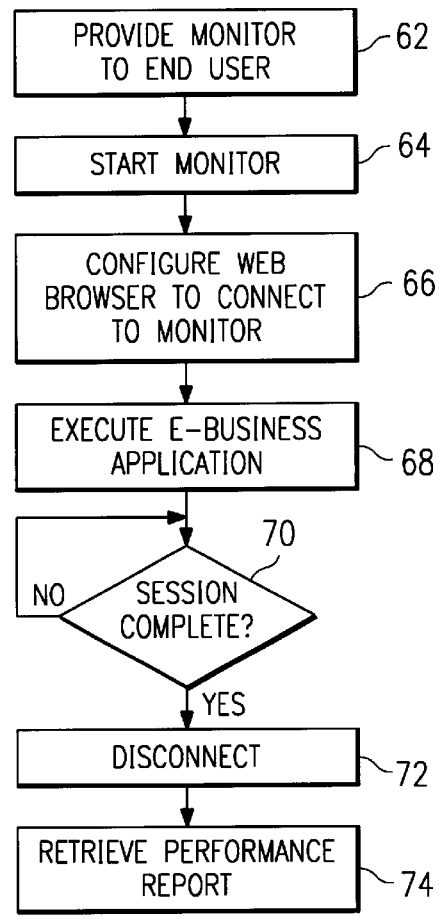
FIG. 4 is a flowchart illustrating a preferred method of using the inventive monitor in an end user measurement environment.

FIG. 4 illustrates a typical scenario for use of the monitor in an end user measurement environment. The routine begins at step 62 with service personnel or the like providing a copy of the monitor to the end user. At step 64, the end user starts the monitor in a "performance recording" mode on the user's client machine. At step 66, the user starts the Web browser and configures it to connect to the monitor (as will be described). The user then executes the e-business application at step 68. A test is then run at step 70 to determine whether the e-business interaction with the monitor has been complete. If not, the routine cycles. If, however, the e-business transaction is complete, the routine continues at step 72 to terminate the e-business interaction with the monitor. At step 74, the monitor performance report is retrieved for analysis.

Because the monitor and the browser preferably (but not necessarily) reside on the same physical machine or machines, third party attacks to observe the unencrypted data between the browser and the monitor are more difficult. Of course, the request file will contain the user's userids and passwords or other private information (since it is necessary to record this in order to replay the session at a later date), and thus, this file needs to be protected to avoid compromising the user's private data. In the system or performance test environment, the private information contained in the request file is test information only. In the end user environment, the file can be encrypted by the monitor using well-known methods.

Figure 5:
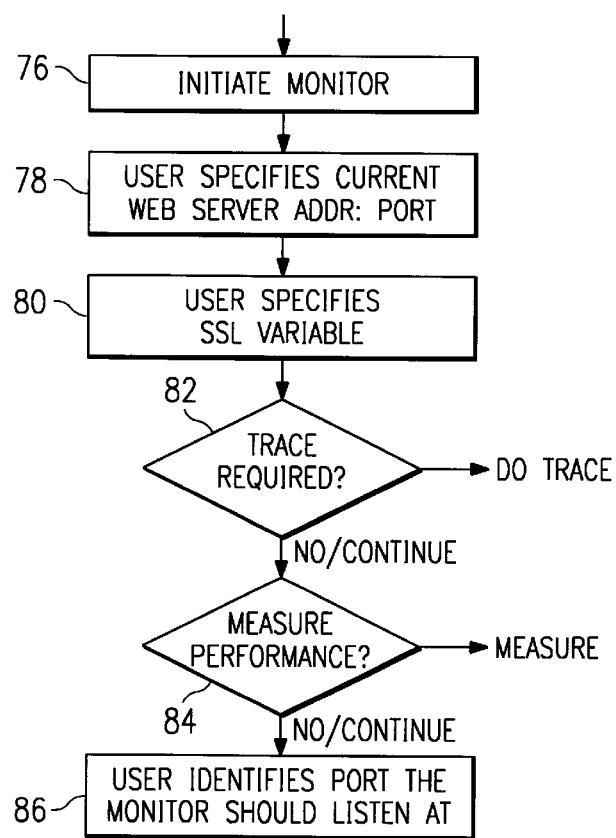
FIG. 5 is a flowchart illustrating a preferred routine for initiating and connecting a Web browser to the monitor.

FIG. 5 is a flowchart illustrating a preferred routine for initializing the monitor routine. The routine begins at step 76 when the monitor is initiated. At step 78, the user specifies to a "current Web server" the Internet address and port number of the Web server application (e.g., www.ebusiness.com:443) on which the application is supported. As will be seen, if (during the session) links are followed to other servers, then the current Web server address can change, which is discussed in detail below. The routine then continues at step 80 with the user specifying whether or not the monitor should use SSL and, if so, what cipher suite to use. As will be seen, the secure sockets (or other such secure) connection may be turned on and off during execution of the e-business application as links to other servers are followed. At step 82, a test is done to determine whether the user desires to write a request file (or, perhaps, select the response time option). At step 84, a test is done to determine whether the user desires to measure performance statistics and to write a performance report file. At step 86, the user identifies the port the monitor should listen at (for purposes of this example, it is assumed that the monitor listens at port 5000, although any suitable available port may be used).

Figure 6:
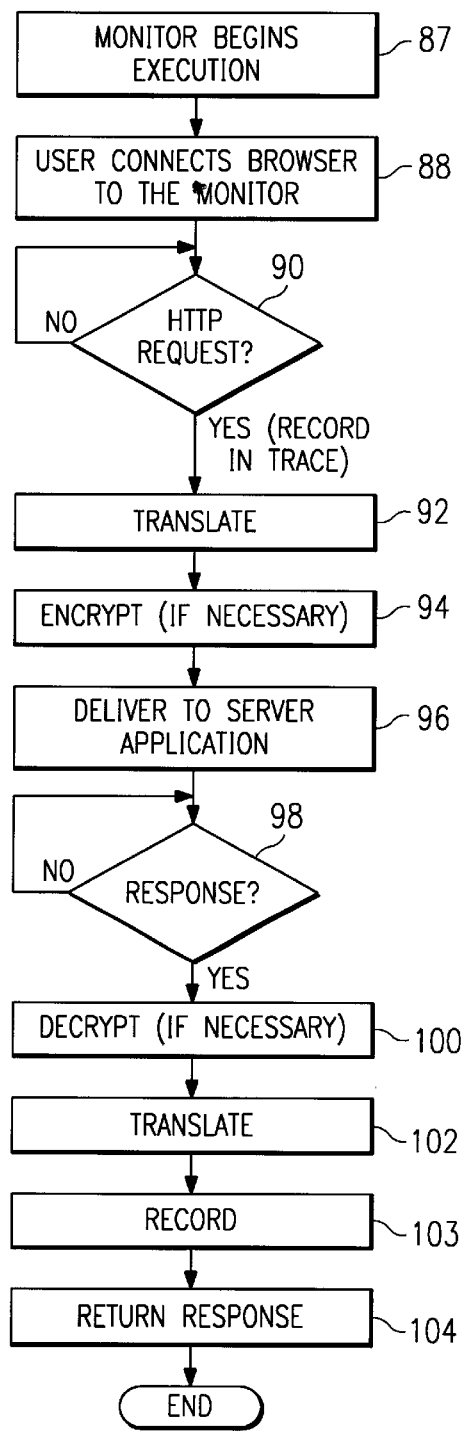
FIG. 6 is a flowchart illustrating a preferred operating routine for the monitor.

FIG. 6 is a flowchart illustrating a more detailed description of the operation of the monitor. The routine begins at step 87 when the monitor begins execution and indicates that it is listening for connections on (for example) local machine port 5000. At step 88, the user starts the Web browser and connects the browser to the monitor. This is done by replacing the host name in the URL that starts the e-business interaction with the local host name and port that the monitor indicated it is listening to. For example, if the URL to initiate the e-business application is "https://www.ebusiness.com/logon" and the monitor indicated it is listening to port 500 on the local host (with name localhost), then the following URL: "http://localhost:5000/logon" would be used by the user.

It should be noted that, even though the server is configured to use the https (or some other secure) protocol, the user specifies an http (or any suitable protocol) connection to the monitor. This is necessary to keep the browser from encrypting the data before it is passed to the monitor. In particular, if the browser initiates a connection to https://localhost:5000/logon, the browser would use the secure socket layer protocol and hence would try to encrypt data being sent to the monitor. As mentioned before, the monitor establishes the https (or other secure) connection to the actual server. From the standpoint of the browser then, it appears that the real server is at localhost:5000 and that the connection is an http connection instead of an https connection.

Once the browser is connected to the monitor, the routine continues at step 90 to test for HTTP requests. If the outcome of the test at step 90 indicates that a request has been passed by the browser to localhost:5000, the routine continues at step 92 to translate the request (as described below). Prior to translation, the URL is recorded. At step 94, the translated request is then encrypted (if the secure protocol is being used) and, at step 96, then sent to the server indicated at the monitor startup time. A test is then done at step 98 to determine if a response to the request has been received. If not, the routine cycles and waits for the response. If the outcome of the test at step 98 indicates that a response has been received, the routine continues at step 100 to decrypt the response (if the secure protocol is being used), perform the translation 102, and then return the response to the browser for rendering at step 104. If desired, information about the response or comprising the response may be recorded at step 103. This completes the process.

As discussed above, to maintain the "masquerade" that the monitor is the server, HTTP requests, as well HTTP and HTML responses, are "translated" so that absolute links within a particular request or response do not directly navigate the user between the page and the server (i.e. without passing first through the monitor). This translation is necessary for several reasons. First, it is important that the browser not see the real URL of the server. If it does, the user could click on a link that points at the true server. At that point, the browser would fetch data directly to the server, bypassing the monitor. In essence, the browser has "escaped" from the monitor. This is undesirable. Second, it is required that the browser continues to use an http (or other like) protocol between itself and the monitor. Otherwise, the data that the monitor wishes to record (when writing the request file) will be encrypted and, hence, unintelligible to the monitor. Moreover, if the browser follows a link to another server, the monitor must intercept that link, replacing it with a substitute or so-called "fake" link that leads back to the monitor. If the browser follows the fake link, the monitor translates it to the true destination, and makes the correct connection for the browser.

To explain the monitor's algorithms for request and response translation, it is first desirable to define what is meant by the "current web server" as well as "relative" and "absolute" links on a Web page. According to the invention, a current_webserver is a state variable maintained by the monitor. It is initialized to the name and port of the Web server specified at the monitor startup time (step 78 in FIG. 5). It is updated by the algorithm as discussed below.

A "relative" link means a link that does not contain a Web server host name. On most web pages, particularly in an e-business web server, most of the links on the pages are relatively addressed. That is, they refer to other links on the same server. An "absolute" link means a link that includes a host name. Such links are typically of the form "http://www.newserver.com/newfile" or "https://www.newserver.com/newfile". In general, according to the invention, a relative link is sent to the current web server. Absolute links require that the monitor change the current web server; the absolute link is thus converted to a relative link and sent to the new current web server. This is the translation process referred to above.

Thus, relative links encountered in an HTML page do not require translation before the HTML page is sent back to the browser from the monitor. Absolute links, however, must be translated to keep the browser from "escaping" from the monitor. Thus, it is desired to translate the absolute links into links that point back at the monitor. The monitor manufactures a "substitute" or fake link name and gives it to the browser instead of the absolute link name. The monitor keeps the true link information and follows the true link for the browser if the browser later requests one of the fake links.

For example, if the server returns an HTML page containing a link of the form: "https://www.newmachine.com/newfile" and, if this is the first absolute link the monitor has encountered, the monitor translates this to a new link name, say: "/monitor000001". It then records the first name in a list called true_link_name•1" and the second link in a list called fake_link_name•1". This is repeated similarly for the second absolute link the monitor encounters and so forth, using names such as "/monitor000002," etc. This process is repeated for each absolute link that the monitor encounters.

Using the routine described above with respect to FIG. 6, when a request is received from the browser, the URL being fetched is compared to the list of fake links. If a match is found, then the monitor sets current_webserver to the host name given in the corresponding true_link_name entry. The monitor sets useSSL to true if the true_link_entry contains "https:" and to false if the true_link entry contains "http:". The monitor then opens the connection to the new current_webserver (using SSL if appropriate) and sends a request for "/newfile" off to the new server. In the example above, if the browser requests "/monitor000001," then the monitor will instead establish an SSL connection to host www.newmachine.com, and ask for the file "/newfile" from that host, using the HTTP method and other data supplied to it by the browser. The current_webserver will become www.newmachine.com.

Request and response translation is also required in the case of HTTP redirect responses. If the server issues a redirect response, the HTTP header contains a new location for the browser to fetch. If this location includes a host name, the browser will fetch it directly, once again allowing the browser to "escape" from the monitor. This problem is solved by watching for redirect responses, capturing the redirect host name and using that name to update the current webserver name. The redirect name is then translated into the monitor's name and the response is returned to the browser. This keeps the browser "captured" in that it still asks the monitor for the next request in spite of the host-to-host redirect that occurred. And, if the next request is a relative request, the monitor will have been redirected to the correct host.

The request and response translation algorithm can now be described in detail. The following internal state variables govern the translations that the monitor makes:

1. current_webserver: the current webserver name and port.

2. have_host_translation: initialized to false. This variable tells the monitor whether or not it has seen the real_host_name and thus, whether or not it has a translation from the current_host_name (the monitor's host and port number) to the host name of the real server (real_host_name).

3. have_url_translations: initialized to false. This variable tells the monitor whether or not it has a list of url translations to apply to the request. have_url_translations is set to true when a previous request sent back to the browser included an absolute link name. The monitor keeps a unique translation for each such link. These translations are kept in an array: true_link_names•". The names that these links were translated to by the monitor are kept in a second array: fake_link_name•". The number of such entries is kept in number_of_link_translations.

4. useSSL: initialized to the value specified by the command line either true (use SSL) or false (do not use SSL). useSSL indicates whether or not the monitor should use SSL in communicating with the current webserver. It is updated when the current webserver changes.

The following translations are performed on a request that the monitor receives from the browser before the request is sent to the server:

1. If have_host_translation is true, change each occurrence of current_host_name (the monitor's name) to real_host_name (the web server's name). This handles such things as the HTTP header entry "Host:" and the HTTP header entry "Referrer:". If have_host_translation is false, do nothing in this step.

2. If have_url_translations is true, then the URL being fetched is compared against the table of fake_link_name. If the URL is found in the fake_link_name list, then the monitor does the following:

a. The current_webserver is updated to the webserver name found in the corresponding real_link_name entry.

b. useSSL is set to true or false depending on whether or not the real_link_name entry contains "https:" or "http:".

c. The fake_link_name is replaced by the file name (the portion of the url after the host name) from the real_link_name entry.

d. the monitor initiates a connection and fetches the file from the new current_webserver, using SSL if useSSL is true.

The following are the translations that the monitor performs on a response that the monitor receives from the host before it returns the request to the browser:

1. If the response is a redirect response, and if the Location: field of the http header includes a host name (even if the host name is that of the current host), then the monitor does the following:

a. It records the host name from the Location Field in the internal state variable "real_host_name". It places the host and port name where the monitor is currently listening for connections in the internal state variable "current_host_name". It then replaces all occurrences of real_host_name in the redirect response with current_host_name.

b. It sets current_webserver to the real host name. Thus any new relative links will be resolved with respect to the new host name.

It may be required to keep the true_link_name and fake_link_name table for each individual web page, since a user can use the history mechanism to recall an old page and click on a link from a previous page.

Although the monitor is described above as an HTTP forwarder, a similar program could be constructed using the HTTP proxy protocol and the monitor could be constructed as an HTTP proxy. The nature of the translations would change, however. In particular, one would still have to translate links returned to the browser to keep the browser from encountering https: links for it to follow. (If the browser encounters an https: link, it will attempt to establish an SSL connection with the monitor.) The problems of having the browser "escape" from the monitor would not occur in the proxy version of the monitor since the browser would be configured to send all requests to the monitor. Thus, the teachings of this invention would apply to such an implementation as well with the following difference. If the monitor is installed in an end user environment, then all requests issued by the user's browser would be routed to the monitor, regardless of whether or not the request was for the server being monitored.

The present invention provides numerous advantages over the prior art. When using the monitor, one merely uses the actual Web pages that are desired to be evaluated when testing the e-business application. The monitor writes the request file, and then that file may be used with a set of HTTP submitter routines to create a benchmark for the application. The inventive solution is thus easy to install and maintain. It does not depend on display layout or browser configuration; indeed, the monitor is independent of the browser.

Because the monitor does not render the Web page, times consumed on the client to do such rendering or other browser specific functions are not included in the response times measured by the monitor. Hence the response time numbers more correctly measure server response time and are less influenced by the speed of the client machine.

This invention thus describes a method of capturing a test workload that has the following characteristics: it functions for Web requests both for http and https (secure sockets) protocols, it is portable and easy to install and use, and it can be used with any Web browser or server. It provides a simple way to generate benchmarks or functional test suites appropriate for measuring the performance of or testing of e-business as well as other server applications. In addition, the method described can be used in the end user environment to provide accurate measurement of the end-to-end response time encountered by the user as the user interacts with the e-business application.

The inventive tool described by this invention preferably only inspects those URLs requested from the server being monitored; other URLs are preferably not even delivered to the tool. From an end user perspective, this can be an important privacy advantage.

One of the preferred implementations of the monitor (and associated routines) of the present invention is as a set of instructions (program code) in a code module resident in the random access memory of the computer, preferably the client computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file.

Moreover, the invention may be used or practiced in any type of Internet Protocol (IP) client, not just within an HTTP-complaint client having a Web browser. Thus, as used herein, references to "browser" should be broadly construed to cover an IP client.

Having thus described my invention, what I claim as new and desire to secure by letters patent is set forth in the following claims.

What is claimed is:

1. A method of generating a trace of requests to a given server application in a computer network during a transaction session initiated from a client having a Web browser, comprising:
   connecting the Web browser to a monitoring process for generating the trace;
   during the transaction session, intercepting each HTTP request intended for the given server application and redirecting the HTTP request to the monitoring process;
   recording the HTTP request in the trace;
   issuing a given request from the monitoring process to the application server;
   delivering a response to the given request from the application server to the monitoring process;
   if the response to the given request includes an absolute URL that that has not been encountered by the monitoring process, translating the absolute URL into a modified URL; and
   returning the response with the modified URL back to the Web browser such that, when the Web browser attempts to retrieve the modified URL, a new HTTP request is passed through the monitoring process and recorded in the trace instead of being used to fetch a resource from the application server directly.

2. The method as described in claim 1 wherein the monitoring process runs on the client machine.

3. The method as described in claim 1 wherein a connection between the Web browser and the monitoring process is not secure.

4. The method as described in claim 3 wherein a connection between the monitoring process and the application server is secure.

5. The method as described in claim 1 wherein the server application is an e-business application.

6. The method as described in claim 1 wherein the computer network is a network selected from the group of networks consisting of an intranet, an extranet and the Internet's World Wide Web.

7. A method of evaluating performance of a given server application in a computer network environment, comprising the steps of:
   connecting a Web browser of a client machine to a monitoring process for generating a trace;
   during a simulated transaction session, forcing any HTTP request intended for the given server application to be redirected to the monitoring process;
   recording each HTTP request in the trace; and
   replaying the trace to gather information to evaluate the performance of the given server application.

8. The method as described in claim 7 wherein the monitoring process runs on the client machine.

9. The method as described in claim 8 wherein a connection between the Web browser and the monitoring process is unencrypted.

10. The method as described in claim 9 wherein a connection between the monitoring process and the application server is secure.

11. The method as described in claim 7 wherein the server application is an e-business application.

12. The method as described in claim 11 wherein the computer network is a network selected from the group of computer networks consisting of an intranet, an extranet and the Internet's World Wide Web.

13. The method as described in claim 7 wherein the step of replaying the trace comprises:
   having each of a set of HTTP submitter routines execute the trace against the server application.

14. The method as described in claim 13 wherein each of the set of HTTP submitter routines simulates a user of a client machine.

15. A computer program product in a computer-readable medium for generating a trace of requests to a given server application in a computer network during a transaction session initiated from a client machine having a Web browser, the program product comprising:
   means supported on the client machine for intercepting any HTTP request issued from the Web browser and intended for the given server application;
   means responsive to the intercepting means for recording information associated with the HTTP request to generate the trace; and
   a set of HTTP processes each of which simulate a live user, wherein each HTTP process replays the trace against the given server application; and
   means for evaluating data generated by the HTTP processes to determine a performance of the given server application against the simulated live users.

16. The computer program product as described in claim 15 wherein the information associated with the HTTP request includes a URL.

17. The computer program product as described in claim 16 wherein the trace comprises a set of URLs and a set of associated responses.

18. The computer program product as described in claim 17 wherein the server application is an e-business application.

19. The computer program product as described in claim 18 wherein the forcing means includes means for forcing the Web browser to issue the HTTP requests to a given port associated with the client machine.

20. A computer program product in a computer-readable medium for performance evaluation of a given server application in a computer network environment, comprising:

means supported on the client machine for intercepting any HTTP request issued from the Web browser and intended for the given server application;

means responsive to the intercepting means for recording information associated with the HTTP request to generate a session trace;

a set of HTTP submitter routines each of which execute the trace against the server application; and means for measuring performance of the server application as the trace is executed by the HTTP submitter routines.

21. The computer program product as described in claim 20 wherein the information associated with the HTTP request includes a URL.

22. A computer connectable to a given server application in a computer network environment, comprising:

a processor;

an operating system;

a Web browser;

means for intercepting any HTTP request issued from the Web browser and intended for the given server application;

means responsive to the intercepting means for recording information associated with the HTTP request to generate a session trace;

a set of HTTP submitter routines each of which execute the trace against the server application; and means for measuring performance of the server application as the trace is executed by the HTTP submitter routines.

23. An e-business transaction session monitor for generating a trace of URL requests to a given e-business server application in a computer network during an e-business transaction session initiated from a client having a Web browser, comprising:

code for forcing an HTTP request issued from the Web browser and intended for the given e-business server application to be redirected through the monitor, wherein the code includes code for rewriting absolute URLs into modified URLs to ensure that the Web browser does not escape from the monitor during the transaction session; and code responsive to the forcing code for recording URLs associated with the HTTP requests to generate a trace.

24. The e-business transaction monitor as described in claim 23 further including means for replaying the trace.

25. The e-business transaction monitor as described in claim 24 wherein the means for replaying comprises:

a set of HTTP submitter routines each of which execute the trace concurrently against the server application; and means for measuring performance of the server application as the trace is executed concurrently by the HTTP submitter routines.

26. The e-business transaction monitor as described in claim 23 wherein the e-business server application is an Internet banking transaction.

27. The e-business transaction monitor as described in claim 23 wherein the e-business server application is an Internet sales transaction.

28. The e-business transaction monitor as described in claim 23 wherein the e-business server application is an Internet supply transaction.

29. The e-business transaction monitor as described in claim 23 wherein the e-business server application is an Internet service transaction.

* * * * *